United States Patent [19]
Boehm et al.

[11] Patent Number: 4,578,726
[45] Date of Patent: Mar. 25, 1986

[54] HEAD ARM MOUNTING DEVICE FOR ONE OR MORE SCANNING HEADS IN RECORDING PLAYBACK APPARATUS FOR DISK RECORDS

[75] Inventors: Udo Boehm; Ernst-Juergen Grittmann, both of Ludwigshafen; Klaus Schulze-Berge, Mutterstadt, all of Fed. Rep. of Germany

[73] Assignee: BASF Aktiengesellschaft, Ludwigshafen, Fed. Rep. of Germany

[21] Appl. No.: 465,761

[22] Filed: Feb. 11, 1983

[30] Foreign Application Priority Data

Feb. 19, 1982 [DE] Fed. Rep. of Germany ....... 3205947
Oct. 11, 1982 [DE] Fed. Rep. of Germany ... 8228522[U]

[51] Int. Cl.$^4$ .................. G11B 5/016; G11B 5/55; G11B 21/08
[52] U.S. Cl. ..................... 360/99; 360/105; 360/106
[58] Field of Search ................... 360/99, 106, 97, 104, 360/105

[56] References Cited

U.S. PATENT DOCUMENTS

| | | | |
|---|---|---|---|
| 3,018,152 | 1/1962 | Cowan | 346/74 |
| 3,156,786 | 11/1964 | Gelletich | 179/100.2 |
| 3,482,060 | 12/1969 | Dermond | 179/100.2 |
| 4,151,573 | 4/1979 | Tandon | 360/104 |
| 4,158,212 | 6/1979 | Dattilo | 360/109 |

FOREIGN PATENT DOCUMENTS

| | | |
|---|---|---|
| 0044151 | 6/1981 | European Pat. Off. . |
| 55-73924 | 6/1980 | Japan . |
| 2000354 | 1/1979 | United Kingdom . |

Primary Examiner—S. J. Heinz
Attorney, Agent, or Firm—Keil & Weinkauf

[57] ABSTRACT

A head arm mounting device for one or more scanning heads in recording/playback apparatus for disk records, especially flexible magnetic disks, includes a pivot shaft for the head arm, this shaft being held in a mount, with the aid of spring means, in a manner such that it has no axial play, and producing, in conjunction with the head arm loading spring, a head loading force which is constant and essentially independent of the head arm deflection. The mounting device consists essentially of a mount and a pivot shaft, either of which may be associated with a spring. A one-piece frame-shaped member with an integral spring constitutes an optimum mount. In an advantageous embodiment, means are provided for finely adjusting the force exerted by the head arm loading spring, and for compensating for tolerances in the spring force of the loading spring in the quantity production of disk drive apparatus.

11 Claims, 20 Drawing Figures

HEAD ARM MOUNTING DEVICE FOR ONE OR MORE SCANNING HEADS IN RECORDING PLAYBACK APPARATUS FOR DISK RECORDS

The present invention relates to a head arm mounting device for at least one scanning head in recording and/or playback apparatus for recording media, especially flexible recording media, consisting of mounting and pivoting means, the head arm, bearing the scanning head and cooperating with a head arm loading spring, being so mounted that it can pivot and yield, in a compliant manner, relative to the recording medium or relative to a further scanning head.

For the purposes of the invention, recording media are magnetic recording media and all types of cards and disks for the recording and/or playback of analog signals or digital signals.

It is known, in connection with drives for flexible magnetic disks, to provide a spring which can be flexed in the transverse direction, for example a leaf spring, and which is attached at one end to the arm carrying the scanning head, and at the other end to the head carriage, the provision of this spring conferring primarily a pivoting function on the arm carrying the scanning head (cf., for example, U.K. Patent 2,000,354); however, the head loading force is adversely affected by such a spring. A head-support mounting device of this type is disadvantageous in that it is not possible to obtain a specific reproducible action with it and to manufacture it at low cost. Even though the known type of head support arm is pressed against the recording medium by means of a loading spring, the result is still imprecise mounting of the head arm, with a variable spring characteristic, and an unfavorable characteristic curve, which is also dependent on the temperature.

An object of the present invention is to provide a head arm mounting device, of the type described above, which is suitable for quantity production and which functions reliably.

We have found that this object is achieved with a head arm mounting device for at least one scanning head in recording and/or playback apparatus for flexible recording media, consisting of mounting and pivoting means, the head arm, bearing the scanning head and cooperating with a head arm loading spring, being so mounted that it can pivot and yield, in a compliant manner, relative to the recording medium or relative to a further scanning head, wherein the mounting and pivoting means comprises a pivot shaft which is held in a mount, with the aid of spring means, in a manner such that it has no axial play.

A very simple mounting device which functions essentially frictionlessly and which is easy to assemble is thus obtained.

Moreover, it is essential to the invention that the combination of the novel mounting device and the loading spring should possess such a spring-characteristic curve that the loading force applied to the scanning head is essentially independent of the deflection of the head relative to the recording medium or relative to the further scanning head.

Due to the fact that the loading force is essentially independent of the deflection of the head, it is possible to use, in one and the same apparatus, recording media having different thicknesses. The use of this mounting device is particularly advantageous in apparatus in which a spring-loaded head-loading system is provided, in which the head or heads are caused to engage the recording medium or media, and to disengage therefrom, by the loading spring. When a head arm loading spring which exerts a linearly increasing loading force is used, it is extremely difficult, as the deflection increases, to so dimension the head arm loading spring and the actuating mechanism for inserting/removing the flexible disk that the disk can be readily inserted and removed without head damage occurring, i.e. without the head or heads being torn off as the disk is inserted, or the resiliently mounted head or heads striking the inside of the drive as it is/they are raised to allow the flexible disk to be removed.

Oscillation of the head arm, which can occur when a prior art "hinge spring" is used, either as a result of the head loading operation or as a result of some effect which is unrelated thereto, is also advantageously avoided by the novel head arm mounting device.

In a further embodiment of the invention, the head arm is mounted on the pivot shaft in a mount having two side arms. As a result, the pivot axis of the head arm is precisely defined.

In a further advantageous embodiment, the mount is essentially U-shaped, the ends of the pivot shaft being mounted on the arms of the U. As a result of this design, a head arm mounting device is obtained which can be manufactured at low cost, and operates with virtually no friction.

In a further embodiment, the side arms of the mount are connected to each other by spring means, so that a constant spring force acts on the pivot shaft, and in addition, assembly of the head arm mounting device is facilitated.

The side arms of the mount can also be connected together by an integral spring. This design enables the mount to be manufactured very economically and further reduces assembly costs. In addition, a fixed relationship between the spring and the mount is obtained, as a result of which the spring force remains constant.

In a further embodiment, the spring acting on the side arms of the mount is replaced by a spring acting directly on the pivot shaft.

It is very advantageous to so adjust the characteristic curve of the combination of the mounting device and the loading spring that is does not deviate by more than approximately ±20 percent from a horizontal line. This constitutes a range which has proven itself in practise.

When a spring acting directly on the pivot shaft or via the mount is employed, the axial force exerted on the shaft should be between 0.5 and 2 kilopond, preferably 0.8 kilopond, thereby ensuring that undesirable head-arm oscillations are eliminated.

Furthermore, it is known, in connection with drives for flexible magnetic disks, to employ a two-armed head arm loading spring, one arm of the spring being attached to the head arm and the other arm being attached to the head carriage. Such a loading spring, which is required to exhibit a specific spring force, cannot be produced economically in large numbers because the spring force of mass-produced springs varies considerably (about 30% deviation from the desired value). The head arm must be pressed against the recording medium by the loading spring with a predetermined force because otherwise the relationship between the scanning head and medium is inexact, which has an adverse effect on the recording and playback operations.

It is also known to urge the head arm toward the recording medium by means of a helical compression spring, the head loading force being adjustable with the aid of a screw. Such a spring has a high spring force progression and at the same time a short travel, so that slight rotation of the screw brings about a considerable change in the spring force and hence fine adjustment is virtually impossible. Moreover, this type of spring is not resistant to distortion caused, in particular, by the frequent head unloading operations, so that an alteration of the pressure exerted by the spring is unavoidable.

A further object of the present invention is to provide a head arm mounting device of the type described at the outset which is suitable for quantity production and exhibits a precise and constant head loading force.

This object is achieved with a head arm mounting device of the said type, wherein the head arm loading spring is a two-armed torsion spring, one arm spring-loading the head arm toward the recording medium, and the other arm of the spring being displaceable by adjustment means for altering the spring force.

A very inexpensive head arm mounting device which is easy to assemble is thus obtained.

Practical embodiments of the adjustment means comprise a rotatably mounted disk having a plurality of steps, a rotatably mounted disk with a continuously rising inclined surface, a vertically displaceable headless screw or a longitudinally displaceable wedge-shaped member. In practise, each type of adjustment means can be produced from a plastics material which is injection-moldable, and is consequently particularly inexpensive.

In a further advantageous embodiment, the novel head arm mounting device together with the loading spring has an adjustable spring characteristic, so that the head loading force is essentially independent of the thickness of the recording medium.

When a head arm loading spring which exerts a linearly increasing loading force is employed, it is extremely difficult, as the deflection increases, to so dimension the loading spring and the actuating mechanism for inserting/removing the flexible disk that the disk can be readily removed without head damage being caused, i.e. without the head or heads being torn off as the disk is inserted or the resiliently mounted head or heads striking the inside of the drive apparatus as it is/they are raised to allow the flexible disk to be removed.

In a very advantageous embodiment, the characteristic curve of the mounting device together with the loading spring is so adjusted that it does not deviate by more than about ±10 percent from a horizontal line.

In the case of commercial drive apparatus for ®FlexyDisks (trademark of BASF Aktiengesellschaft, 6700 Ludwigshafen, Germany) where the requisite head loading force is about 18±2 pond, the range of adjustment is about ±10% of this value, i.e. about 4 pond. The range of adjustment can of course be appropriately selected for any type of disk drive apparatus, it being governed by the particular head loading force.

Further details of the invention are disclosed in the following description of the embodiments given by way of example and illustrated in the accompanying drawings, in which.

Figure 1:
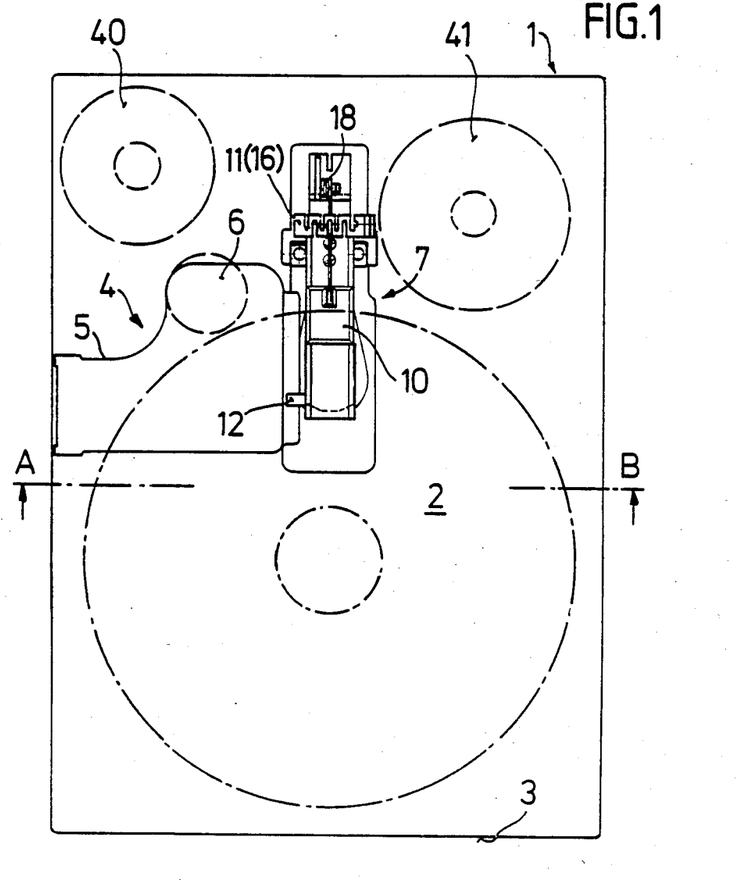
FIG. 1 is a schematic plan view of a drive apparatus for flexible magnetic disks for recording data, showing a head arm mounting device according to the invention.

A drive apparatus 1 for FlexyDisks® (registered trademark of BASF Aktiengesellschaft, Ludwigshafen), is shown in FIG. 1, a flexible magnetic disk 2 having already been introduced through the insertion-flap 3. Following its insertion, the disk 2 is clamped in its operative position by a clamping mechanism, which is not shown, and caused to rotate. After the required speed of rotation has been reached, a head-loading mechanism 4 is energized, this mechanism comprising a pivotable member 5, an actuator 6, and a head carriage 7, shown here with a fixed head 8 and a movable head 9, the latter being located on a head arm 10, which is pivotably mounted on a mount 11.

Figure 2:
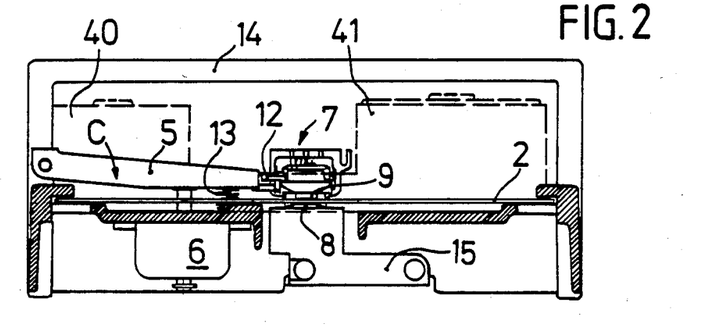
FIG. 2 is a side view, partially in section, of the drive apparatus shown in FIG. 1.

The pivotable member 5 thereupon moves downward, in the direction indicated by arrow C, and in doing so disengages from a tab 12 on the head arm 10 and compresses a spring 13 which had hitherto been pushing the head arm 10 upward, via member 5, against the downwardly acting force of a torsional loading spring 18. The head 9 comes into contact with the disk 2 which, for the sake of simplicity, is shown without its cover jacket. The head 9 presses, with the force exerted by the spring 18, against the disk 2, and the fixed head 8, which can, of course, also be resiliently mounted, is located approximately opposite the head 9, in contact with the underside of the disk. The spring 13 is associated with the actuator 6 and, in the non-operative state of the actuator, urges the pivotable member 5 upward. FIG. 2 shows the head-loading mechanism 4 in the position in which the head is loaded (heads in the operative position, in contact with the disk 2).

From this position, the member 5 pivots upward in the opposite direction to that indicated by arrow C, under the action of the spring 13, and moves the head 9 out of contact with the disk 2, whenever the insertion-flap 3 of the apparatus is opened. It is evident from FIG.

2 that the design and arrangement of the actuator 6 and the spring 13 are such that the head 9 does not move toward head 8, at least during the disk-loading operation. The speed with which head 9 approaches head 8 is determined by the dimensions selected for the spring 18. When head 9 pivots away from head 8, the speed at which it does so is determined only by the spring 13. The drive motor of the apparatus 1 is marked 40, and the stepping motor for positioning the heads 8 and 9 is marked 41.

Figure 3:
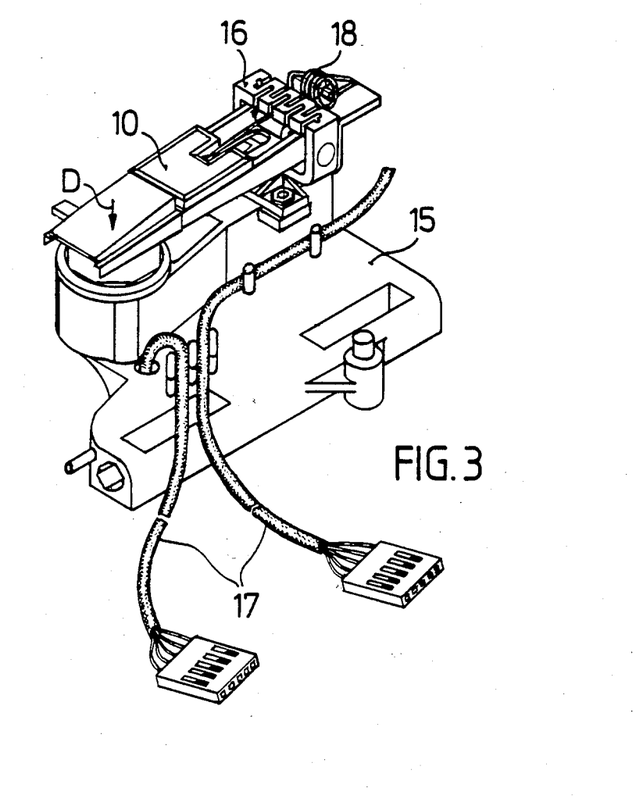
FIG. 3 is a perspective view of a carriage with the head arm mounting device of FIG. 1.
Figure 7:
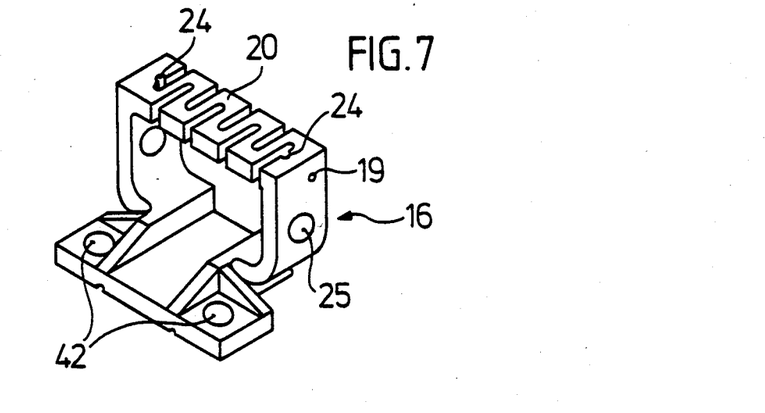
FIG. 7 is a schematic perspective view of a one-piece mount, according to the invention, with an integral spring.

A carriage with a head arm mounting device according to the invention is shown in perspective in FIG. 3. Visible in this Figure are the carriage 15, the head arm 10 bearing the movable head 9, which cannot be seen here, the fixed head 8, a mounting device 16 for the head arm 10, and connecting leads 17 with sockets. The head arm 10 is pressed, in the direction indicated by arrow D, against the disk 2, i.e. urged toward the head 8, by means of the torsion spring 18 which is located at its pivot end, behind the device 16. The novel mounting device 16 is shown in detail in FIGS. 7, 7A and 7B. The mount 19 can be secured to the carriage, which is not shown in these Figures, by means of screws or similar fastening means which pass through the holes 42. The mount 19 is of one-piece construction incorporating an integral tension spring 20 in meander form. Here, as well as in all other embodiments, the spring 20 exerts a specific axial force on the pivot shaft 21, as a result of which the mounting of the head arm 10 is characterized by the absence of play and by extremely low friction, so that the requisite head-loading force is almost free from hysteresis and remains constant even in the event of temperature variations. In order to insert the pivot shaft 21 into the bearings 22, which are suitably secured, for example by means of an adhesive or a press fit, in holes 25 drilled in the side arms 23 of the mount 19, the points of a suitable pair of pliers are inserted in notches 24 in the spring 20 and opened, thus splaying out the legs 23 and stretching the spring 20, within the elastic range, to such an extent that the pivot shaft 21 can be inserted in the bearings 22, whereupon the spring is allowed to contract, thus causing the shaft to be retained in the bearings without play. In this embodiment, the ends of the pivot shaft 21 are in the form of conical points 26, and the bearings 22 include corresponding conical depressions. It is also possible, as shown in FIG. 5, to provide the pivot shaft 28 with rounded or spherical ends 27 which rotate in appropriately recessed bearings 29.

Figure 7A:
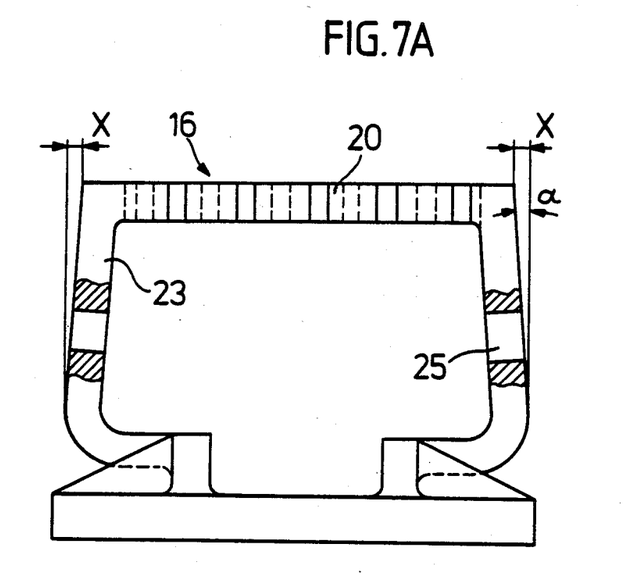
FIG. 7A is a schematic front elevation, partly in section, of the mount of FIG. 7, without the pivot shaft.
Figure 7B:
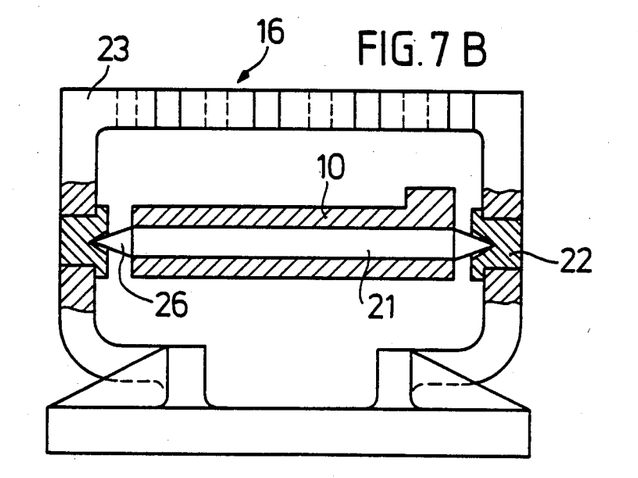
FIG. 7B shows the same view as in FIG. 7, but with the pivot shaft.

FIG. 7A shows the deflections X of the two side arms of the mount 19, and hence the extent to which the spring 20 can be stretched for the purpose of inserting the pivot shaft 21. FIG. 7B shows the arms in a vertical position following insertion of the shaft. If the material of construction mentioned below is employed, the angle α can be approximately 5°. However, this angle can also be larger or smaller, depending on the material of construction used for the mount. The spring bias and hence the axial force continuously exerted on the pivot shaft is determined by the magnitude of the deflections X.

Figure 4:
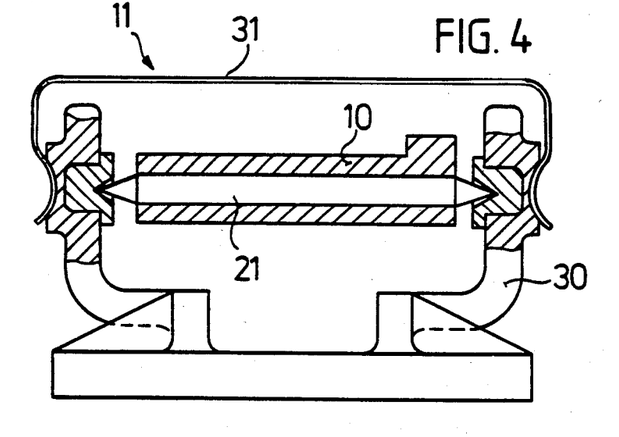
FIG. 4 shows another novel head arm mounting device with a pivot shaft and a separate compression spring.
Figure 5:
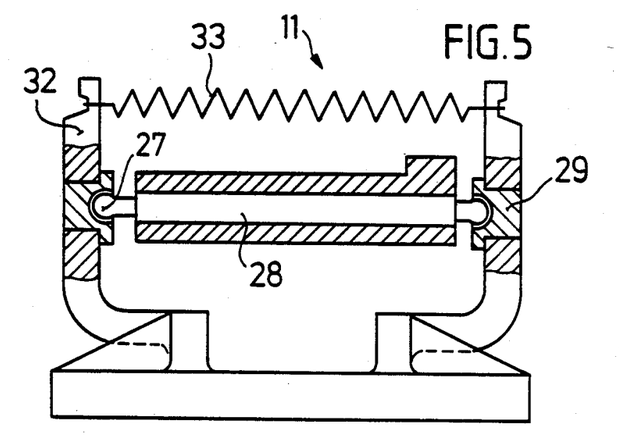
FIG. 5 shows a further novel head arm mounting device with a pivot shaft and a separate tension spring.
Figure 6:
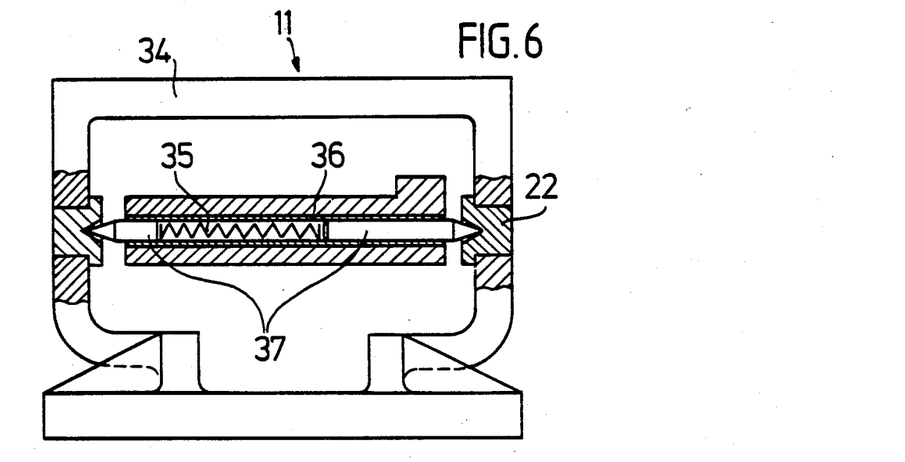
FIG. 6 shows yet another novel head arm mounting device with a hollow pivot shaft and a compression spring located therein.

Further head arm mounting devices 11 are shown in FIGS. 4 to 6. FIG. 4 shows a U-shaped mount 30 with a compression spring 31 connecting the arms. FIG. 5 likewise shows a U-shaped mount 32 with a tension spring 33 which is hooked over the ends of the arms. A mount 34 of one-piece construction is again shown in FIG. 6. In this embodiment a spring acting directly on the side arms of the mount is not required because the necessary axial force is applied by means of a compression spring 35 which is located inside a hollow pivot shaft 36. It is of course also possible to replace the pivot shaft by two pointed members 37 which are urged apart by an interposed spring 35, the pointed members and spring being mounted essentially without play in a press-fitted bush in the head arm 10.

The mounting devices 11, 16, which have been described, have the advantage, because they employ conical bearings or ball-and-socket-type bearings, that they enable the head arm to be mounted, without adjustment, in a reliable manner, without play and virtually without friction. As a result, a simple, non-adjustable spring, which may be a torsion spring 18, or any other type of spring, for example a leaf spring, can be advantageously used to apply the requisite loading force directly to the head arm 10.

Figure 8:
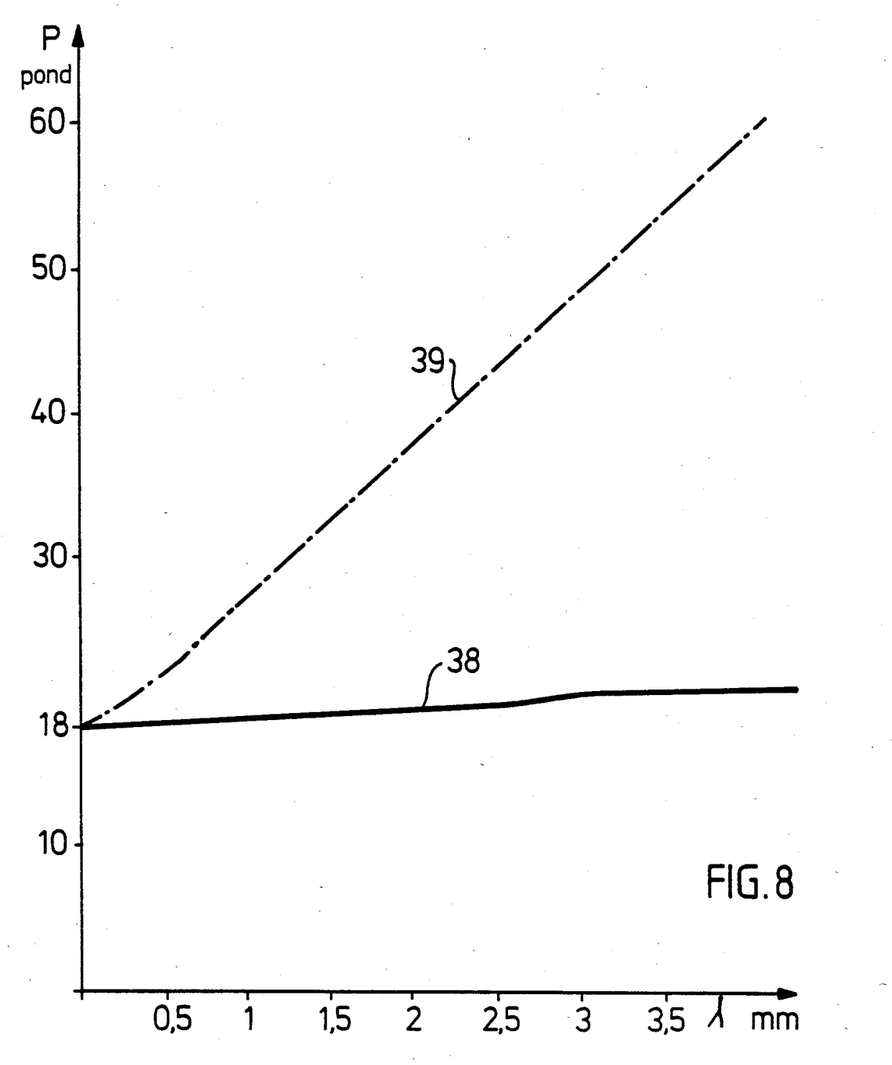
FIG. 8 shows the spring-characteristic curve of the combination of the mount according to FIG. 7 and the loading spring according to FIG. 3.

The preferred spring-characteristic curve 38 is represented, in the graph shown in FIG. 8, as a continuous line, this characteristic curve being determined almos exclusively by the loading sprin9 18. In this graph, the progression is approximately +20%, i.e. approximately 3 pond in the case of a requisite head loading force of 18 pond. A general deviation, from the horizontal line, of approximately ±20% is regarded as permissible. An approximately horizontal characteristic curve is therefore obtained, so that the load exerted on the head is essentially independent of the momentary head arm deflection. In contrast to this, a characteristic curve 39 is shown which has been obtained with a prior art arrangement employing a leaf spring as pivot, and an adjustable compression spring which acts, perpendicularly to the plane of the leaf spring, on the head arm. The characteristic curve 39 is very steep, which necessitates the use of a much more powerful spring 13 in the head-loading mechanism 4, which has disadvantageous results. Furthermore, as a result of the leaf spring exhibiting very marked progression high acceleration forces act on the head 9 during the head-loading operation, and these forces can lead to the destruction of the heads and disks, or can at least cause them to wear prematurely.

Even when a leaf spring serving as pivot and a torsional load spring such as are described in U.K. Patent No. 2,000,354 are used, more highly progressive spring characteristics occur, due to the presence of the leaf spring, which cannot be readily compensated for. In addition, undesirable head-arm oscillations occur, and the rigid fastening of dissimilar materials (plastic/metal) renders the known mounting device extremely sensitive to changes in temperature. The materials employed for the leaf spring and for the head arm possess different coefficients of expansion, and it is likewise only possible to compensate for the resulting effects with difficulty.

The following advantages are obtained when the mounting devices according to the invention, as described above, are employed:

any play occurring as a result of temperature variations is compensated for by the spring acting directly or indirectly on the pivot shaft, without any significant increase in the bearing friction, head-arm oscillations are prevented by selecting a suitable value for the axial pressure which is applied to the pivot shaft, adjustment of the mounting device or the loading spring is unnecessary, assembly of the head arm mounting device is simplified, matching of the force of the spring of the head-loading mechanism to that of the head arm loading spring is avoided, the steps of manufacturing the mounting device are simplified and hence are less expensive.

The mounts of the embodiments which have been described and which are shown in FIGS. 1 to 7, may be made of any suitable material, but are preferably manufactured from a plastic having suitable elastic properties. A suitable material is, for example, polyoxymethylene (Ultraform ®, registered trademark of BASF Aktiengesellschaft, Ludwigshafen). The use of plastics, which may if desired be glass-fiber-reinforced, enables these mounts to be mass-produced, at low cost, by injection-molding, or a similar process. It is also possible, of course, to use metal spring materials. For example, the legs of the U-shaped mount can consist of strips of spring metal. Commercially available spring clips and helical springs can be used as the metal springs employed in the embodiments shown in FIGS. 4 to 6. The pivot shaft 21, 28, 37 can be made of metal and can, for example, be a commercially available conical pivot. The ends 26, 27 can also be made of another more wear-resistant material having better frictional properties. The bearings 22, 29 can consist of, for example, jewels or semi-precious stones, the hardness of which is matched to the hardness of the ends of the pivot shaft. Jeweled bearings of this type can also be inset into suitable metal bushes, so that more secure attachment to the mount is achieved. The head arm mounting devices according to the invention have been tested, and proved to be outstandingly durable and reliable in operation.

Figure 9:
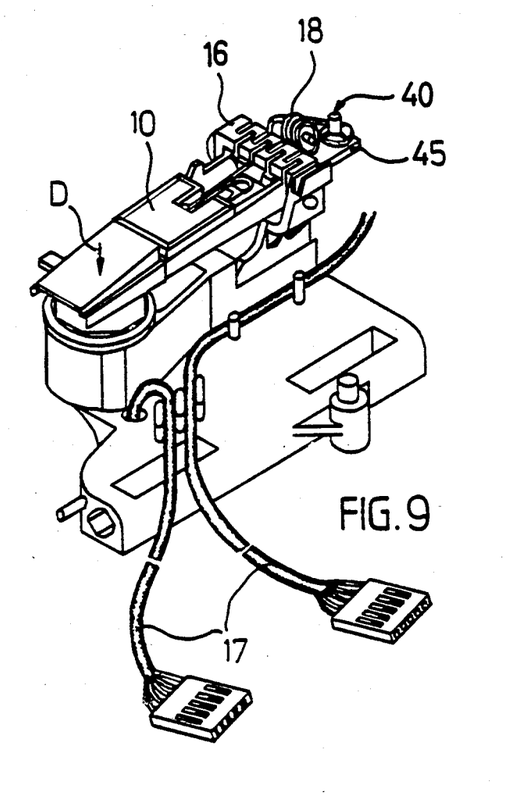
FIG. 9 is a schematic perspective view of a carriage with a novel head arm mounting device.

FIG. 9 shows a head carriage of the same design as that shown in FIG. 3, with a further variant of the novel head arm mounting device. Shown in this Figure are a support 45 with an adjustment means 40, the head arm 10 bearing the movable head 9 (not visible here), the fixed head 8, the novel mounting device 16 for the head arm 10, and connecting leads 17 with sockets. Here again, the head arm 10 is pressed, in the direction indicated by arrow D, against the disk 2, i.e. urged toward the head 8, by means of the torsion spring 18 which is located at its pivot end on the support 45.

Figure 10:
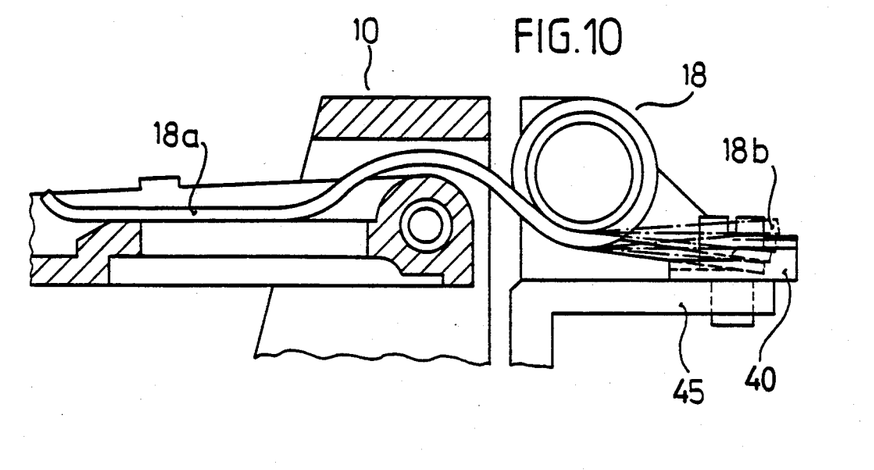
FIG. 10 is an enlarged side elevation, partly in section, of the torsional loading spring together with adjustment means in the form of a rotatable member comprising a stepped disk, FIGS. 11a and 11a' are respectively schematic side and plan views of the adjustment means according to FIG. 10, and FIGS. 11b, b' to 11d d' are respectively schematic side and plan views of further practical embodiments of novel adjustment means.

The requisite head loading force is applied directly to the head arm 10 by a simple power spring which is advantageously in the form of a torsion spring 18. 40 designates an adjustment means for the rear linear end of the torsion spring 18. The adjustment means is shown in greater detail in FIGS. 10 and 11. The preferred characteristic curve is determined almost exclusively by the head arm loading spring 18. The progression is about ±10%, i.e. approximately 4 pond, in the case of a requisite head leading force of 18±2 pond. A general deviation, from the horizontal, of approximately ±10% is regarded as permissible. As a result, an approximately horizontal characteristic curve is obtained, so that the load exerted on the head is essentially independent of the momentary head arm deflection.

Figure 11A:
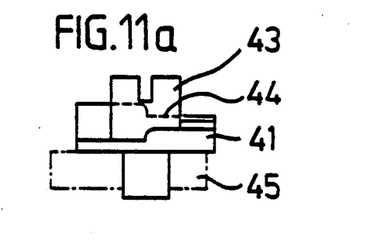
Figure 11B:
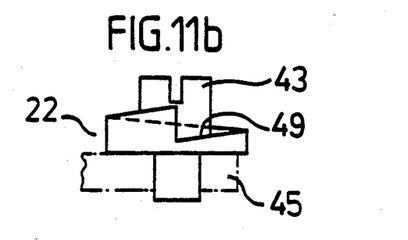
Figure 11C:
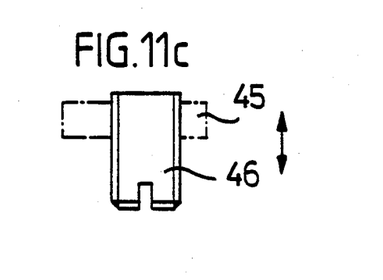
Figure 11D:
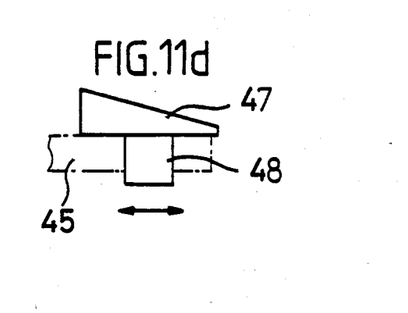

The adjustment means 40 enables the rear linear end 18b of the spring 18 to be displaced in a vertical direction. The front elongated linear end 18a of the torsion spring exerts pressure on the head arm 10 and hence determines the head loading force. The latter can be adjusted in a surprisingly simple manner by altering the vertical position of the rear end 18b of the torsion spring. The adjustment means 40 shown in FIG. 10 may comprise a rotatable disk 41 or 42, as shown in FIGS. 11a and 11a' and FIGS. 11b and 11b'; disk 41 has, for example, 4 steps 44, whereas disk 42 has a continuously rising inclined surface 49. The adjustment means also includes a cylindrical projection and a slotted head 43, so that it can be rotated in the support 45. The adjustment means of FIGS. 11c and 11c' consists of a headless screw which can be turned by means of the slot in its lower end and is thus displaceable in the support 45 in the directions indicated by the double arrow. FIGS. 11d and 11d' show, as a further variant, a wedge-shaped member 47 with a locating pin 48 which is displaceable in an elongated hole (not shown) in the support 45 in the directions indicated by the double arrow.

The range of adjustment of spring 18 is governed by the predetermined head loading force of the drive apparatus in question. In the case of commercial floppy disk drives where the head loading force ranges from 18 to 22 pond, the range of adjustment is advantageously about ±10% of this force. If, for example, four steps 44 are employed, each step can be allocated a change in the spring force of 1.5 pond. However, any desired change in the spring force can be allocated to each step, provided that it can be achieved in a simple manner. It is for instance possible to make each step of the disk 41 0.5 mm high, each step bringing about a change in the spring force of about 1 pond. Part of the range of adjustment is usually required to compensate for tolerances in the force of the loading spring.

The disk 41 can be prevented from rotating in one direction if the linear end 18b of the loading spring bears against the edge of a step. The other adjustment means 42, 46 and 47 should be self-locking, so that they cannot loosen of their own accord. It is also possible to design the stepped disk 41 and the headless screw 46 to be displaceable parallel to the linear end 18b of the loading spring, so that the effective lever arm and hence the spring force can be altered.

All the above-described embodiments of the adjustment means can be made of any suitable material, preferably an injection-moldable plastic. It is advantageous to use the same material for the adjustment means and the support 45, so that the coefficient of expansion of both parts is the same.

We claim:

1. In an apparatus for recording on, and/or playing back from, recording media, especially a flexible recording disks, of the type having a carriage, a head arm which carries a magnetic scanning head, and a suspension system for pivotally mounting said head arm on said carriage including a loading spring for pivotally biasing said head arm, said suspension system comprising a U-shaped mount formed on said carriage, said U-shaped mount having upstanding legs which straddle said head arm and which terminate at respective free ends a pivot shaft about which said head arm is mounted for pivoting movement, said shaft having respective ends supported by said legs at intermediate points on said legs, and tension spring means integrally formed with the U-shaped mount to span between the free ends of said legs for resiliently urging said legs toward the ends of said shaft so as to eliminate axial plat of said shaft in the operation of said apparatus.

2. A suspension system as claimed in claim 1, wherein said integrally formed spring means is of meander shape.

3. A suspension system as claimed in claim 1, wherein said tension spring means is dimensioned so that the axial force exerted by said legs on said pivot shaft is between 0.5 and 2.0 kilopond, preferably 0.8 kilopond.

4. a suspension system as claimed in claim 1, wherein the loading spring is dimensioned so that the loading spring, together with the remainder of the suspension system as well as with the head arm and the head, exhibits a spring characteristic such that the loading force applied by the head on the recording media is substantially independent of the pivotal deflection of the head.

5. A suspension system as claimed in claim 4, in which the spring characteristic varies at most by approximately ±20% from the spring characteristic when horizontal.

6. A suspension system as claimed in claim 1, wherein the loading spring is a torsion spring one of whose ends is connected with the carriage by way of an adjustment device for varying the loading force.

7. A suspension system as claimed in claim 6, wherein the adjustment device is in the form of a rotatably mounted stepping disk having a plurality of steps, preferably four steps.

8. A suspension system as claimed in claim 6, wherein the adjustment device is in the form of a rotatably mounted disk having a continually rising inclined surface.

9. A suspension system as claimed in claim 6, wherein the adjustment device is in the form of a vertically displaceable headless screw.

10. A suspension system as claimed in claim 6, wherein the adjustment device is in the form of a longitudinally displaceable wedge-shaped member.

11. A suspension system as claimed in claim 6, wherein the adjustment device is made of a plastics material.

* * * * *